United States Patent
Paetsch

(10) Patent No.: US 12,101,636 B2
(45) Date of Patent: Sep. 24, 2024

(54) METHOD FOR PROVIDING A DATA CONNECTION TO THE INTERNET AT A TELECOMMUNICATION TERMINAL AS WELL AS SERVER SYSTEM AND MOBILE RADIO GATEWAY

(71) Applicant: LinkXess GmbH, Berlin (DE)

(72) Inventor: Frank Paetsch, Berlin (DE)

(73) Assignee: LinkXess GmbH, Berlin (DE)

( * ) Notice: Subject to any disclaimer, the term of this patent is extended or adjusted under 35 U.S.C. 154(b) by 317 days.

(21) Appl. No.: 17/649,770

(22) Filed: Feb. 2, 2022

(65) Prior Publication Data

US 2022/0248231 A1  Aug. 4, 2022

(30) Foreign Application Priority Data

Feb. 3, 2021  (DE) ..................... 10 2021 102 446.3

(51) Int. Cl.

| | |
|---|---|
| *H04W 12/00* | (2021.01) |
| *H04W 8/20* | (2009.01) |
| *H04W 12/45* | (2021.01) |
| *H04W 76/12* | (2018.01) |
| *H04W 88/16* | (2009.01) |

(52) U.S. Cl.
CPC ............ *H04W 12/45* (2021.01); *H04W 8/20* (2013.01); *H04W 76/12* (2018.02); *H04W 88/16* (2013.01)

(58) Field of Classification Search
None
See application file for complete search history.

(56) References Cited

U.S. PATENT DOCUMENTS 10,477,030 B2 * 11/2019 Zhao ................... H04M 7/0075
10,652,728 B1 * 5/2020 Guday .................. H04W 48/16
(Continued)

FOREIGN PATENT DOCUMENTS

DE  103 11 980 A1  9/2004
DE  103 14 144 A1  10/2004
(Continued)

OTHER PUBLICATIONS

Office Action issued in German Patent Application No. 10 2021 102 446.3 dated Nov. 10, 2021.
(Continued)

*Primary Examiner* — Brandon M Renner
(74) *Attorney, Agent, or Firm* — Workman Nydegger

(57) ABSTRACT

A method, including: assigning a SIM card to a telecommunications terminal and recording this assignment on a server; providing the SIM card to a mobile radio gateway; logging in a radio module of the mobile radio gateway to the mobile radio network using the provided SIM card; setting up a mobile radio data connection by the logged in radio module of the mobile radio gateway via the mobile radio network to the Internet; setting up a first secure data connection between the mobile radio gateway and the server; setting up a second secure data connection between the telecommunications terminal and the server; and connecting the first secure data connection and the second secure data connection by the server for the provision of a data connection of the telecommunications terminal to the Internet via the second secure data connection, the first secure data connection and the mobile radio data connection.

19 Claims, 5 Drawing Sheets

(56) References Cited

U.S. PATENT DOCUMENTS

| | | | |
|---|---|---|---|
| 11,057,827 B1* | 7/2021 | Dreiling | H04W 60/04 |
| 2006/0126645 A1 | 6/2006 | Devarapalli et al. | |
| 2011/0019654 A1 | 1/2011 | Harmatos et al. | |
| 2014/0206363 A1* | 7/2014 | Paetsch | H04W 4/24 |
| | | | 455/445 |
| 2020/0260354 A1* | 8/2020 | Ma | H04W 48/14 |
| 2021/0219138 A1* | 7/2021 | Comarmond | H04W 12/35 |
| 2021/0368432 A1* | 11/2021 | Tsuda | H04W 48/18 |
| 2022/0217554 A1* | 7/2022 | Martin, II | H04M 1/24 |

FOREIGN PATENT DOCUMENTS

| | | |
|---|---|---|
| DE | 102011007814 A1 | 10/2012 |
| EP | 2557854 A2 | 2/2013 |
| EP | 2 700 281 B1 | 12/2014 |
| EP | 3310018 A1 | 4/2018 |

OTHER PUBLICATIONS

European Search Report for European Patent Application No. 22153660.0, dated Jul. 5, 2022.

* cited by examiner

METHOD FOR PROVIDING A DATA CONNECTION TO THE INTERNET AT A TELECOMMUNICATION TERMINAL AS WELL AS SERVER SYSTEM AND MOBILE RADIO GATEWAY

FIELD OF THE DISCLOSURE

The disclosure relates to a method for providing a data connection to the Internet on a telecommunications terminal, and a server system and mobile radio gateway.

BACKGROUND

It is known that a mobile radio terminal sets up access to the Internet via its "own" mobile radio network or home mobile radio network to which the SIM card of the mobile radio terminal is assigned. This can be done using different technologies, such as 3G, 4G and 5G. However, if a mobile radio terminal is not situated in the reception area of the home mobile radio network, for example because the mobile radio terminal is located abroad, direct dial-in to the home mobile radio network is not possible. This is associated with the disadvantage of a reduction in the services available to the mobile radio terminal, since some services are available on a national basis only and cannot be used from abroad, even with roaming. Such nationally based services which cannot be used from abroad relate, for example, to the login to a bank or the use of specific accounts, such as a national Twitter account.

Similarly, the problem of being able to dial in to the Internet and use services effectively in a different country can also arise for a telecommunications terminal which is not a mobile radio terminal.

A method for routing telecommunications connections to a mobile radio terminal which is not situated in the reception area of its home network is known from EP 2 700 281 B1. It is provided here that SIM information data of a SIM card of the mobile radio terminal are transmitted via data transmission to a mobile radio gateway which then logs in to the mobile radio home network of the mobile radio terminal at the location of the mobile radio gateway using these information data. A telecommunications connection directed to the call number of the mobile terminal is forwarded from the mobile radio gateway to the mobile radio terminal.

The object of the present invention is to provide an effective method for providing a data connection to the Internet on a telecommunications terminal, and a mobile radio gateway and a server system which enable a telecommunications terminal to provide a connection to the Internet via a specific mobile radio network.

ASPECTS OF SOME EXAMPLE EMBODIMENTS

A first aspect of the invention regards a method for providing a data connection to the Internet on a telecommunications terminal using a mobile radio network. The mobile radio network can be the mobile radio network to which a SIM card considered below is assigned (in which case the mobile radio network is referred to as the home mobile radio network), or alternatively any other mobile radio network. The latter case involves, in particular, a mobile radio network of a different country which differs from the country in which the home mobile radio network of the SIM card is implemented.

The method provides that a SIM card is assigned to a considered telecommunications terminal. A SIM card can be assigned in this way, for example, by the user of the telecommunications terminal or by a server. The assignment can be initiated manually or automatically. In any event, the assignment is recorded on the server, so that the server is aware that a considered SIM card is assigned to the considered telecommunications terminal.

In a subsequent step, the SIM card assigned to the telecommunications terminal is provided to a mobile radio gateway. To do this, for example, the SIM card is provided to the mobile radio gateway by the server or by a separate SIM server communicating with the server, as will be explained below. In this context, it should be noted that a SIM card within the meaning of the present disclosure can be a physical SIM card or an eSIM (electronic SIM). The provision of a SIM card within the meaning of the present disclosure means that SIM information data are provided which enable the SIM card to log in to the mobile radio network. If the SIM card is thus provided to the mobile radio gateway, this does not mean a physical provision of a SIM card, but rather the provision of electronic SIM information data which enable a login in the mobile radio network. A SIM card normally comprises an IMSI (IMSI="International Mobile Subscriber Identity"), a PIN (PIN="Personal Identity Number"), security algorithms and user-specific data as SIM information data. A SIM card personalizes a mobile radio terminal in respect of the user and in respect of the network operator, and enables the billing of call charges by the network operator. A SIM card is also referred to as a UICC ("Universal Integrated Circuit Card"). The disclosure therefore uses the term "provision of a SIM card" to refer to data assigned to and identifying a physical SIM card or an eSIM.

Following the provision of the SIM card on the mobile radio gateway, a radio module of the mobile radio gateway logs in to the mobile radio network using the provided SIM card. In particular, the radio module logging in with the SIM card is identified and authenticated.

Two cases can be distinguished here. If the mobile radio network is the home mobile radio network of the SIM card, a login to the home mobile radio network is performed. If the mobile radio network is a different mobile radio network which is not the home mobile radio network of the SIM card, a login to the mobile radio network is performed via roaming, i.e. the radio module with the SIM card logs in by means of roaming in the mobile radio network. In both cases, a login to the mobile radio network is performed.

Following the login of the radio module, a mobile radio data connection is set up from the radio module via the mobile radio network to the Internet. The mobile radio data connection can be set up in a known manner using an APN (APN="Access Point Name") of the radio module. The mobile radio data connection can be set up, for example, to a dial-in point or gateway of the mobile radio network into the Internet so that access to the Internet, in particular the "local" Internet which is connected to the network gateway, is available via the mobile radio network. A gateway of this type represents the interface between the switching network of the mobile radio network and the Internet or packet data network. The connection that is set up is referred to as the "mobile radio data connection", since it is set up via the mobile radio network.

The method according to the disclosure further provides the setting up of a first secure data connection between the mobile radio gateway and the server, wherein data are transmittable transparently between the Internet and the server via the mobile radio data connection and the first secure data connection. The secure data connection is, for example, a VPN tunnel (VPN="Virtual Private Network") or other tunnel. A secure data connection which enables the secure transmission of data is thus provided between the server and the mobile radio gateway (more precisely: the considered radio module of the mobile radio gateway). The data are transmitted transparently in the sense that the payload data of the transmitted data packets are forwarded and not modified.

A second secure data connection is further set up between the telecommunications terminal and the server. As will be explained below, in different design variants, the second secure data connection can be set up temporally before or after the first secure data connection.

The first secure data connection and the second secure data connection are implemented via a packet-switched network such as the Internet.

Finally, the first secure data connection and the second secure data connection are connected or assigned to one another by the server so that a data connection of the telecommunications terminal to the Internet is provided via the second secure data connection, the first secure data connection and the mobile radio data connection.

The method is based on the notion of providing two interlinked secure data connections between the telecommunications terminal and the mobile radio gateway with the intermediate connection of the server, said secure data connections providing the telecommunications terminal with secure data access to the mobile radio network for, wherein the telecommunications terminal can dial in directly to the remotely disposed mobile radio network via the linked secure data connections and via the mobile radio gateway. If, for example, the telecommunications terminal is located in country A and the mobile radio gateway and the mobile radio network are located in country B, a data connection is provided from the telecommunications terminal in country A to the mobile radio gateway in country B and the telecommunications terminal logs in to the mobile radio network via the mobile radio gateway by means of the SIM card in country B.

Direct access to the mobile radio network is provided by the method according to an aspect of the invention, even though the telecommunications terminal is located in a different area or in a country other than the country in which the mobile radio network is implemented. The telecommunications terminal has direct data access to the mobile radio network via the interlinked secure data connections.

Insofar as the mobile radio network is the home mobile radio network of the SIM card concerned, the telecommunications terminal can use all services of the home mobile radio network without national restrictions in terms of the available services. For the home mobile radio network, a direct login to the home mobile radio network is performed. Aspects of the disclosure thus avoid a restriction of the services available from abroad.

Insofar as the mobile radio network is a different mobile radio network which is not the home mobile radio network of the SIM card concerned, aspects of the solution according to the disclosure effectively enable the implementation of test scenarios. In this case, the radio module of the mobile radio gateway logs in to the mobile radio network via roaming. SIM cards can be assigned to the mobile radio gateway for test scenarios in order to check the usability of individual services in the case of a roaming of this type. A German mobile radio provider, for example, can check which services its own customers can use if they dial in, in the USA, to a local US mobile radio network without a presence in the USA being required for this purpose. It is possible to test, for example, whether the owner of a SIM card of a German mobile radio network, after dialing in via roaming to a US mobile radio network, can continue to retrieve email messages (he presumably can) or can continue to dial in to his bank (he presumably cannot). Any two different countries and national mobile radio networks can obviously be involved here.

Quality parameters, such as, for example, the bandwidth and different tariffs of the mobile radio connections set up in the other country with a local mobile radio network via roaming, can also be tested along with the availability of services in the other country. Test scenarios of this type can be performed automatically using different SIM cards from different providers in different foreign networks.

The telecommunications terminal can, for example, be a mobile radio terminal, a PC (PC="Personal Computer") or a tablet computer. In principle, any telecommunications terminals can be used.

It should be noted that the "data connections" within the meaning of the present disclosure are implemented on layers 1 to 4 or 1 to 5 of the OSI reference model (OSI="Open Systems Interconnection") according to document ITU-T X.200 (July 1994), i.e. they do not necessarily relate to specific applications or services. The data connections provide the connectivity on the basis of which the telecommunications terminal can then implement applications and services. Aspects of the invention allow different operating systems (for example Android, IOS, Windows, Linux, etc.) and applications (for example streaming services, Twitter, Facebook, etc.) to communicate directly with the destination mobile radio network by means of the data connections so that operating systems/applications can be used and tested as if through direct dial-in to the mobile radio network.

Reference is further made to the following explanations regarding the terminology used. A mobile radio gateway provides an interface between one or more telecommunications mobile radio networks and any other networks, for example a telecommunications fixed network or an IP network. A mobile radio gateway is called by a user of a different network or receives data messages from the latter and forwards the desired connection/data packets via a mobile radio channel into the mobile radio network in which the recipient is located. To do this, the mobile radio gateway implements the functionality of a mobile radio telephone and to some extent sets up a connection to the recipient as a mobile radio telephone. Mobile radio gateways thus have the same mobile radio modules as those used in mobile radio terminals (cell phones). Mobile radio gateways of this type are known, for example, from DE 103 14 144 A1. It is provided here that a mobile radio gateway contains a multiplicity of SIM cards for the managed mobile radio channels. Any SIM cards of different network operators can be used.

In an embodiment the SIM card is provided to the mobile radio gateway by the server. In this case, the server, in addition to its functionality as a data router between the two secure data connections, is a SIM server which manages a multiplicity of SIM cards. The role which the server plays in aspects of the method whereby it is involved in and interconnects secure data connections not only to the mobile radio gateway but also to the telecommunications terminal is further reinforced insofar as the server also manages the SIM cards and assigns one of the SIM cards managed by the server to the telecommunications terminal and provides it to the mobile radio gateway.

A SIM server is a server which manages and provides SIM cards for mobile radio communication. Depending on needs and requirements, a SIM card is requested by a mobile radio gateway from the SIM server and is provided by the latter to the mobile radio gateway. The SIM cards can be provided electronically as eSIMs or can be managed via a cloud-based management. A SIM card is not provided physically at the mobile radio gateway, neither if the SIM card is a physical SIM card nor if the SIM card is an eSIM. Only the SIM information data which identify a SIM card and reflect its functionality are transmitted to the mobile radio gateway. The SIM card is thus located to some extent virtually on the SIM server or is managed by the latter and its functionality is emulated on demand on the mobile radio gateway on the basis of specific information and data which are transmitted by the SIM server. This enables the use of a central SIM card pool for one or more mobile radio gateways. SIM servers of this type are described, for example, in DE 103 11 980 A1.

A further design provides that the SIM card is provided to the mobile radio gateway by a separate SIM server which differs from the server which sets up the first secure data connection to the mobile radio gateway and the second secure data connection to the telecommunications terminal. In such a case, however, the SIM server and the server communicate with one another. In particular, it can be provided that the server issues or forwards the command to the SIM server to provide a specific SIM card to the mobile radio gateway. It can generally be provided that the command or trigger for the SIM server to provide a specific SIM card to the mobile radio gateway is provided by manual information, for example triggered by a user, or by automatic information, for example time-controlled information. The SIM server can receive a corresponding command from the server, directly from a user or in a different manner.

It can further be provided that the SIM server, following the provision of the SIM card in the mobile radio gateway, informs the server of this provision so that the server is aware that a specific SIM card (i.e. the SIM card which has been assigned to the telecommunications terminal) has been provided to the mobile radio gateway.

A further design provides that the SIM card is assigned to the telecommunications terminal by the SIM server.

A further embodiment provides that the second secure data connection between the telecommunications terminal and the server is set up temporally before the first secure data connection between the mobile radio gateway and the server, wherein the setting up of the second secure data connection triggers the provision of the SIM card in the mobile radio gateway. According to this design variant, a secure data connection—the second secure data connection—is first set up between the telecommunications terminal and the server. A SIM card is assigned to the telecommunications terminal via this data connection. Simultaneously, the setting up of this second secure data connection automatically triggers the provision of the SIM card in the mobile radio gateway (directly by the server or an assigned SIM server). If the first secure data connection between the mobile radio gateway and the server is set up at a later time, the server then only has to connect this first secure data connection with the previously set up second secure data connection between the telecommunications terminal and the server.

Alternatively, it is provided that the first secure data connection between the mobile radio gateway and the server is set up temporally before the second secure data connection between the telecommunications terminal and the server. In such a case, it can be provided that a separate connection is set up between the server and the telecommunications terminal for the assignment of the SIM card to the telecommunications terminal, but said separate connection is then released once more and also does not need to be a secure connection. In such a case, it can be provided that the telecommunications terminal issues a command to the server which triggers a provision of the SIM card in the mobile radio gateway, even without a command of this type necessarily being transmitted via a secure connection to the server. Alternatively, it can be provided that the telecommunications terminal issues a command directly to the mobile radio gateway for the provision of the SIM card in the mobile radio gateway.

One embodiment provides that the server connects the first secure connection and the second secure connection by assigning the two connections to one another so that the data of the one connection can be forwarded onto the other connection and vice versa. An assignment of this type can be performed, for example, via IP addresses of the two secure data connections. The second secure data connection, which is designed, for example, as a VPN tunnel, is thus assigned its own IP address which identifies the VPN tunnel. The first secure data connection, which is similarly designed, for example, as a VPN tunnel, is correspondingly assigned its own IP address which identifies this VPN tunnel. The server, being involved in both secure data connections, knows both IP addresses, and also knows that the same SIM card is assigned to both secure data connections and can assign the latter to one another and can forward incoming and outgoing data packets onto the respective other secure data connection, wherein the server performs an IP routing.

One embodiment provides that the telecommunications terminal, following the provision of a data connection of the telecommunications terminal to the Internet, implements an application or a service and for this purpose sets up a telecommunications connection to a server of the Internet and/or to a further telecommunications terminal. A telecommunications connection of this type serves to implement the application or the service, wherein the previously provided connectivity or the provided data connections are used to set up the telecommunications connection and transmit payload data via the telecommunications connection. An SMS/MMS message, for example, is transmitted to and/or received from a server of the Internet and/or a further telecommunications terminal via the telecommunications connection. A corresponding service can be made available on the user side or on the server side (for example via a web server).

As a further additional option, a voice call can be made available between the Internet and the telecommunications terminal, for example via VoIP. The server acts here as a switching system in order to implement messages and calls between the mobile radio gateway and the telecommunications terminal.

As already explained, the mobile radio network can be a mobile radio network of a geographical region other than the region in which the home mobile radio network of the SIM card is present. In particular, the mobile radio network can be a mobile radio network of a country other than the country in which the home mobile radio network of the SIM card is implemented. A radio module of the mobile radio gateway logs in to the mobile radio network using the provided SIM card through roaming.

Alternatively, it can be provided that the mobile radio network is the home mobile radio network of the SIM card, i.e. the mobile radio network to which the SIM card is assigned.

Further designs provide that the first secure data connection and/or the second secure data connection are additionally encrypted. An unfalsifiable and secure data path through to the remote mobile radio network is guaranteed through the use of encryption methods.

Design variants can further be provided in which algorithms define the logical connection between a telecommunications terminal and the SIM card that is used and/or the provision of the SIM card in the mobile radio gateway. In particular, a time-based control of the use of the SIM card can be provided in the mobile radio gateway, wherein the use of the SIM card is controlled by parameters such as e.g. network quality, data throughput, prepaid credit, number of SMS, MMS, calls, call minutes, data volumes used, etc. An automatic control of this type can be used, for example, to implement test scenarios.

In a further aspect, the present disclosure relates to a server system, comprising:
means which are provided and designed to assign a SIM card to a telecommunications terminal;
means which are provided and designed to provide the SIM card assigned to the telecommunications terminal to a mobile radio gateway;
means which are provided and designed to cause the mobile radio gateway to log in to the mobile radio network using the received SIM card and set up a mobile radio data connection via the mobile radio network to the Internet;
means which are provided and designed to set up a first secure data connection between the server and a mobile radio gateway, wherein data are transmittable transparently between the mobile radio network and the server via the mobile radio data connection and the first secure data connection;
means which are provided and designed to set up a second secure data connection between the server and the telecommunications terminal; and
means which are provided and designed to connect the first secure data connection and the second secure data connection for the provision of a data connection of the telecommunications terminal to the Internet via the second secure data connection, the first secure data connection and the mobile radio data connection.

Said means comprise, for example, a processor to execute instructions and a memory which is connected to the processor and in which instructions are stored which, when executed by the processor, cause the processor to carry out said steps. In other words, the means are implemented by software in combination with a processor which executes the software. Said means can be implemented in each case by their own processor with assigned software, or said means can be provided jointly by one or more processors.

It should be noted that, in embodiments, the server system can be divided into at least two different physical or virtual servers. In particular, a division can be provided in such a way that the server system comprises a separate SIM server, wherein the means which are provided and designed to provide the SIM card assigned to the telecommunications terminal to a mobile radio gateway are provided by the SIM server. The other means are implemented, for example, in a different server.

The SIM server makes the SIM card available to the mobile radio gateway and thus initiates the login of the mobile radio gateway. The command or trigger for the SIM server to make the SIM card available to the mobile radio gateway can be provided in a variety of ways, for example by means of manual information, for example triggered by a user, or by automatic, for example time-controlled, information.

In one design, the means which are provided and designed to cause the mobile radio gateway to log in to the mobile radio network using the received SIM card and set up a mobile radio data connection via the mobile radio network to the Internet are also integrated into said SIM server.

However, it should be noted that a division of the server system into at least two different physical or virtual servers is not necessarily the case. Alternatively, all means of the server system are implemented in one server. It can be provided that a server of this type further comprises means which are provided and designed to manage a plurality of SIM cards, wherein, as already mentioned, the term "SIM card" comprises physical SIM cards and/or eSIMs. The server therefore additionally comprises the functionality of a SIM server.

It should further be noted that the means which are provided and designed to cause the mobile radio gateway to log in to the mobile radio network using the received SIM card and set up a mobile radio data connection into the mobile radio network are provided, for example, by means which generate a message which is transmitted to the mobile radio gateway, wherein the message contains the SIM information data, and wherein the reception of the message in the mobile radio gateway triggers the login of the SIM card and the setting up of the mobile radio data connection.

In a further aspect, the present disclosure relates to a mobile radio gateway, comprising:
a plurality of radio modules for mobile radio communication, wherein SIM cards which in each case allow a use of the radio module for mobile radio communication in a mobile radio network are assignable to the mobile radio gateway;
means which are provided and designed to receive a SIM card and assign it to one of the radio modules, wherein the radio module is provided and designed to log in, after receiving the SIM card, to the mobile radio network using the received SIM card and set up a mobile radio data connection via the mobile radio network into the Internet;
means which are provided and designed to set up a first secure data connection between the mobile radio gateway and a server and to interconnect the mobile radio data connection and the first secure data connection, wherein data are transmittable transparently between the mobile radio network and the server via the mobile radio data connection and the first secure data connection.

In relation to the mobile radio gateway also, it also applies that said means comprise, for example, a processor to execute instructions and a memory which is connected to the processor and in which instructions are stored which, when executed by the processor, cause the processor to carry out said steps. In other words, the means are implemented by software in combination with a processor which executes the software. Said means can be implemented in each case by their own processor with assigned software, or said means can be provided jointly by one or more processors.

BRIEF DESCRIPTION OF THE DRAWINGS

Aspects of the invention are explained in detail below on the basis of a plurality of example embodiments with reference to the figures of the drawing. In the drawing.

DETAILED DESCRIPTION

Figure 1:
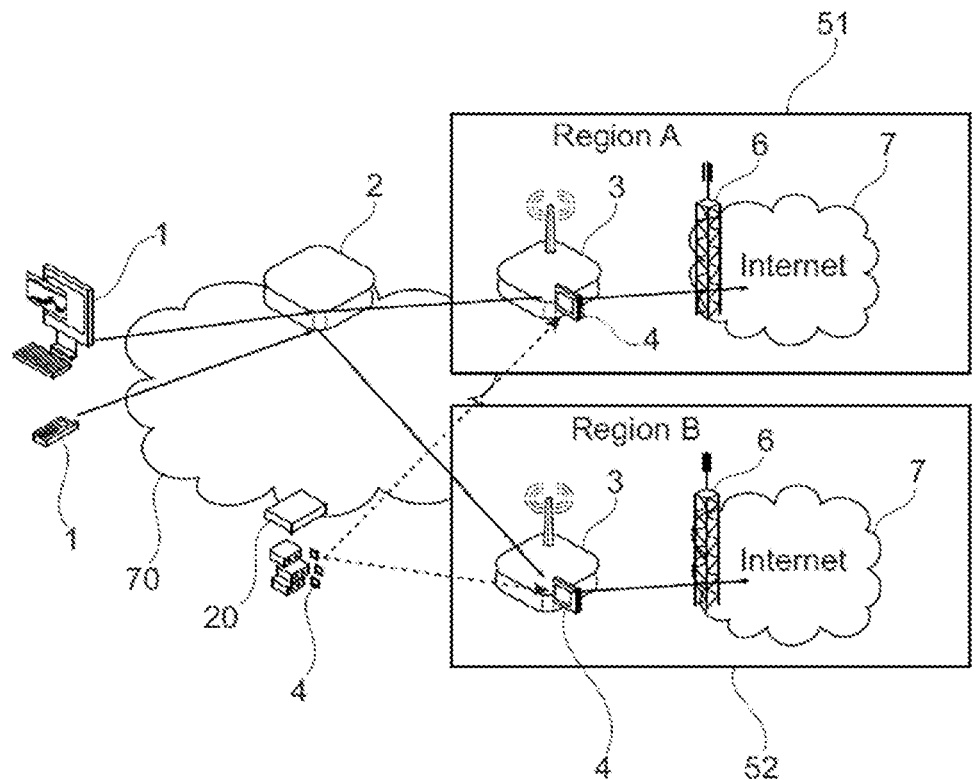
FIG. 1 shows an example embodiment of a telecommunications arrangement which is suitable for and designed to carry out a method for providing a data connection to the Internet on a telecommunications terminal.

FIG. 1 shows a telecommunications arrangement which comprises networks and telecommunication components with which a method according to the invention for setting up a data connection to the Internet is implementable.

The telecommunications arrangement comprises, as components, a telecommunications terminal 1, a server 2, a mobile radio gateway 3, a SIM card 4, mobile radio networks 51, 52 and the Internet 7.

The telecommunications terminal 1 can be a mobile radio terminal or a non-mobile terminal, for example a PC or a tablet computer. The telecommunications terminal 1 can communicate via a packet switching network, for example the Internet 70 or an Intranet, with the server 2. The server 2 can similarly communicate via the packet switching network with the mobile radio gateway 3.

The server 2 serves to provide a secure data connection between the telecommunications terminal 1 and the mobile radio gateway 3, as will be explained below. It can be provided that the server 2 additionally has the functionality of a SIM server and manages a pool of SIM cards 4. The SIM cards 4 can be disposed physically in the server 2 or can be present as eSIMs in the server. Alternatively, as shown in FIG. 1, a separate SIM server 20 can be provided which is designed, for example, as a cloud-based SIM management system, wherein the server 2 communicates with the SIM server 20 and, for example, transmits commands to the SIM server to provide specific SIM cards 4 to the mobile radio gateway 3. The server 2 and the SIM server 20 form a server system within the meaning of the present disclosure.

It is assumed below that a SIM server 20 is assigned to the server 2, wherein the SIM server 20 performs the actual management of the SIM cards, wherein, as explained, this functionality can alternatively be integrated into the server 2.

The server 2 can logically assign a specific SIM card to the telecommunications terminal 1, for example in response to a corresponding command from the server 2 or from the telecommunications terminal 1. The server 2 can, for example in response to a command from the telecommunications terminal 1 or automatically at its own instigation, further cause the SIM server 20 to provide the SIM card 4 logically assigned to the telecommunications terminal 1 to the mobile radio gateway 3, wherein the provision of a SIM card 4 of this type is not performed physically, but instead only the SIM information data which identify a SIM card and reflect its functionality are transmitted by means of data transmission via the network 70 to the mobile radio gateway 3.

The mobile radio gateway 3 comprises a plurality of radio modules for mobile radio communication (not shown separately). A plurality of SIM cards 4 are assigned and assignable to the mobile radio gateway 3, in each case enabling a use of a radio module for mobile radio communication. A radio module transmits data onto a mobile radio channel and receives data via the mobile radio channel. One or more SIM cards are assignable to each radio module, wherein only one SIM card is ever activated at a specific time.

The mobile radio gateway 3 is located in the receive range of a mobile radio network, wherein two mobile radio gateways 3 which are located in each case in a different mobile radio network 51, 52 are presented in the example embodiment shown in FIG. 1. The different mobile radio networks 51, 52 are located in different regions A, B which are, for example, different countries. Each mobile radio network 51, 52 further comprises a plurality of mobile radio transmit stations 6, as shown schematically in FIG. 1. Each mobile radio network 51, 52 further comprises a gateway into the local Internet 7, i.e. the mobile radio network 51, 52 comprises, in a manner known per se, not shown in detail, dial-in points or local gateways into the Internet 7.

The telecommunications arrangement shown in FIG. 1 is based on the initial situation wherein the telecommunications terminal 1 is located in a country or region other than the country or region in which the mobile radio network 51, 52 (generally referred to below as the mobile radio network 5) is implemented. A connection between the telecommunications terminal 1 and the server 2 is provided via the network 70 as a secure data connection in the form of a VPN tunnel. A secure data connection in the form of a VPN tunnel is similarly provided via the network 70 between the server 2 and the respective mobile radio gateway 3. The mobile radio network 5 in the receive range of which the mobile radio gateway 3 is located can be the home mobile radio network of the respective SIM card 4 via which a connection is set up into the mobile radio network 5. However, this does not necessarily have to be the case. Alternatively, the mobile radio network 5 in the receive range of which the mobile radio gateway 3 is located can be a mobile radio network to which the SIM card 4 is not assigned, in which case a dial-in to the mobile radio network is performed by the mobile radio gateway 3 or a radio module of the mobile radio gateway 3 via roaming.

Figure 2:
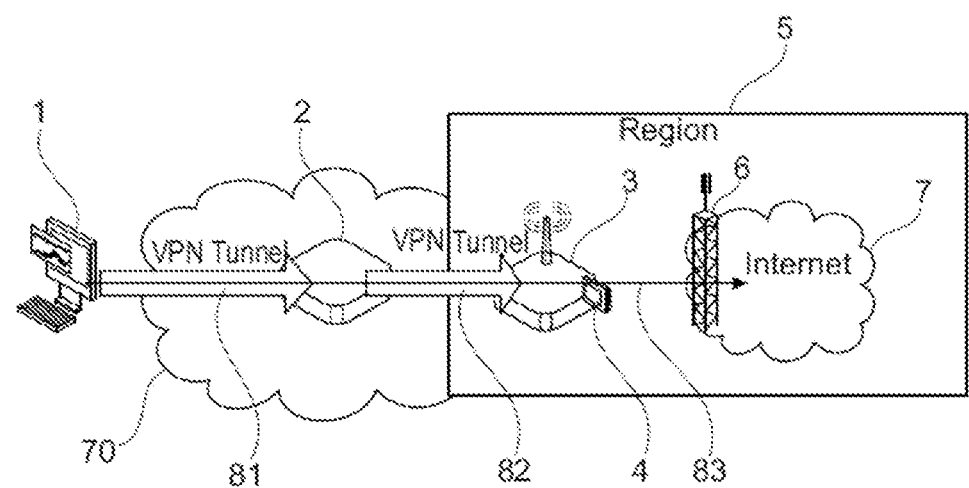
FIG. 2 shows, in a telecommunications arrangement according to FIG. 1, an illustration of the data connections between the telecommunications terminal and the Internet, wherein the data connections comprise secure data connections between the telecommunications terminal and a server and between the server and a mobile radio gateway.

FIG. 2 shows schematically the data connections that have been set up. A secure data connection 81, which is referred to as the second secure data connection, is set up in the form of a VPN tunnel between the telecommunications terminal 1 and the server 2. A further secure data connection 82, which is referred to as the first secure data connection, is set up in the form of a VPN tunnel between the server 2 and the mobile radio gateway 3. A mobile radio data connection 83 into the mobile radio network 5 exists between the mobile radio gateway 3 or its radio module logged in to the mobile radio network 5. This data connection 83 can be extended into the Internet 7 by means of a gateway.

Typical scenarios are as follows:
Scenario 1: the telecommunications terminal 1 is located in the home country, for example in Germany. The mobile radio network 5 and the mobile radio gateway 3 are located abroad, for example in the USA. The mobile radio network 5 is not the home mobile radio network of the SIM card 4 which is used to dial in to the mobile radio network 5.
Scenario 2: the telecommunications terminal 1 is located abroad, for example in France. The mobile radio network 5 and the mobile radio gateway 3 are located in the home country, for example in Germany. The mobile radio network 5 is the home mobile radio network of the SIM card 4 which is used to dial in to the mobile radio network 5.

Figure 9:
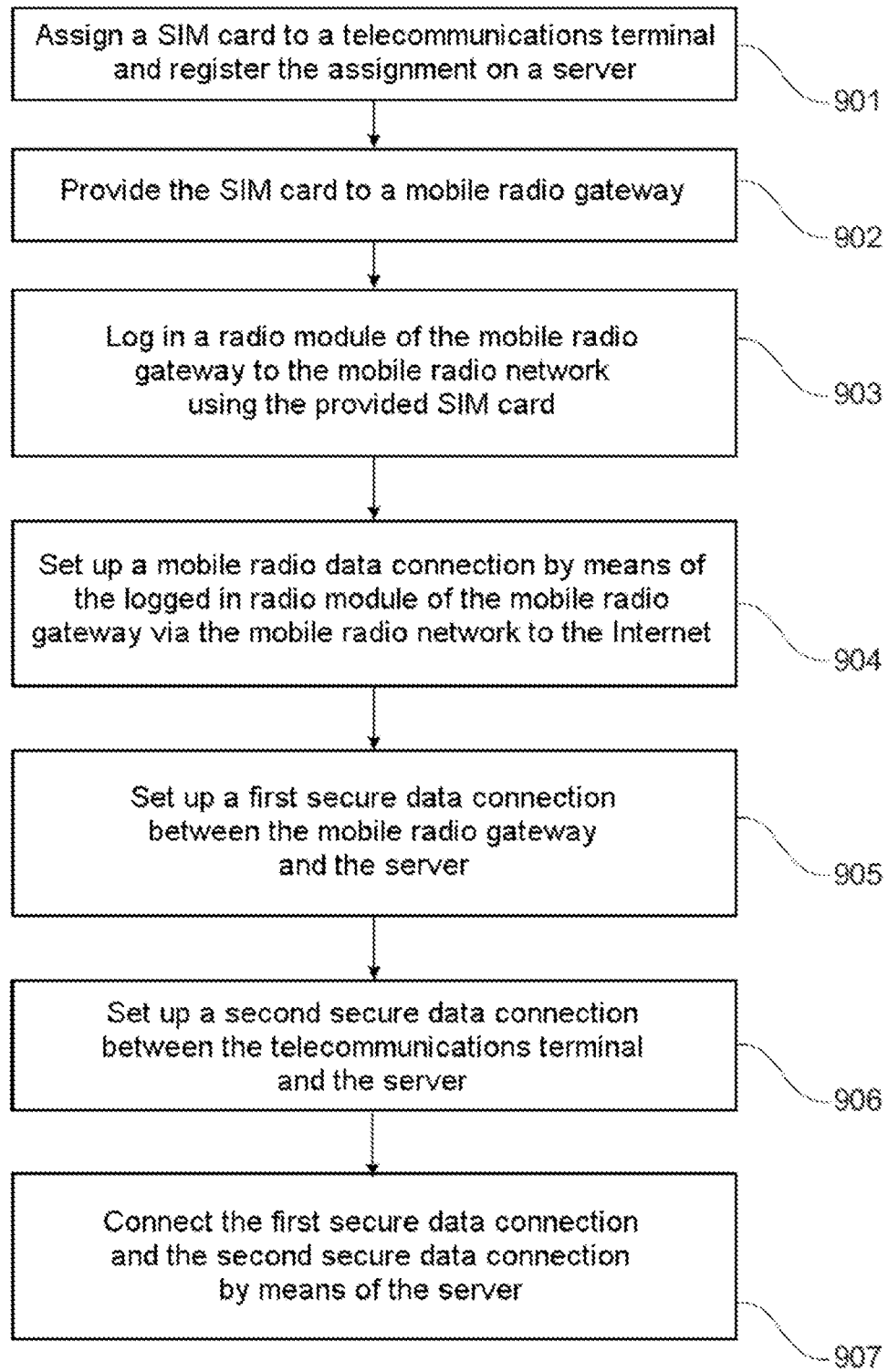
FIG. 9 shows a flow diagram representing steps of a method for providing a data connection to the Internet on a telecommunications terminal.

The method carried out with the telecommunications arrangement according to FIG. 1 is explained by way of example with reference to FIG. 9. According to step 901, a SIM card 4 is assigned to the telecommunications terminal and this assignment is recorded on the server 2. Only a logical assignment of the SIM card 4 to the telecommunications terminal 1 is performed, without the SIM card 4 or SIM information data being transmitted to the telecommunications terminal 1. Accordingly, it is also not relevant to the present method whether the telecommunications terminal 1 is a mobile radio terminal or a different telecommunications terminal. The logical assignment can be performed automatically or by means of a manual command. It is provided here, for example, that the SIM card 4 is assigned to the telecommunications terminal 1 by the server 2 which communicates with the SIM server 20 for this purpose.

According to step 902, the SIM card 4 is provided to the mobile radio gateway 3. The SIM information data are transmitted from the SIM server 20 (or alternatively from the server 2) to the mobile radio gateway 3 for this purpose. In step 903, a radio module of the mobile radio gateway 3 logs in to the mobile radio network 5 using the provided SIM card 4. As already mentioned, the mobile radio network 5 can be the home mobile radio network of the SIM card 4, in which case a direct login is performed, or it can be a different mobile radio network, in which case a login is performed via roaming.

In step 904, a mobile radio data connection is set up into the Internet by the logged in radio module via the mobile radio network 5. Then, according to step 905, the first secure data connection 82 is set up by means of a VPN tunnel between the mobile radio gateway 3 and the server 2. A second secure data connection 83 is set up according to step 106 by means of a VPN tunnel between the telecommunications terminal 1 and the server 2. This secure data connection 83 can have been set up already in advance or is set up after the secure data connection 82.

According to step 907, the first secure data connection 82 is connected by the server 2 to the second secure data connection 81. As a result, a data connection of the telecommunications terminal 1 to the Internet is provided via the second secure data connection 81, the first secure data connection 82 and the mobile radio data connection 83 (see also FIG. 2). The server 2 ensures that the two secure data connections 81, 82 are assigned to one another and data are forwarded onto the respective other data connection so that the two secure data connections 81, 82 together implement a VPN tunnel from the telecommunications terminal 1 through to the mobile radio gateway 3.

According to the above scenario 1, the provided method allows the implementation of different test scenarios, wherein it is possible to test which services are provided with which quality features to a user who dials in to a mobile radio network in the USA with his SIM card which is assigned to a German mobile radio network. These test scenarios can be implemented without the need to dial in with a telecommunications terminal in situ in the USA. The two secure data connections 81, 82 form a data access by means of data transmission via the Internet (and not via mobile radio networks or telecommunications networks) to the mobile radio gateway 3 in the other country.

According to the above scenario 2, the provided method allows the use of all services which are available in the home network, even if the telecommunications terminal 1 is located abroad. The telecommunications terminal 1 located abroad can dial in via the data access formed by the two secure data connections 81, 82 to the mobile radio gateway 3 of the home mobile radio network, so that no restrictions exist in terms of the available services. The commands and signaling between the individual components of the telecommunications arrangement which enable access to the Internet and the use of different services are explained below in FIGS. 3 to 8 on the basis of a plurality of example embodiments.

Figure 3:
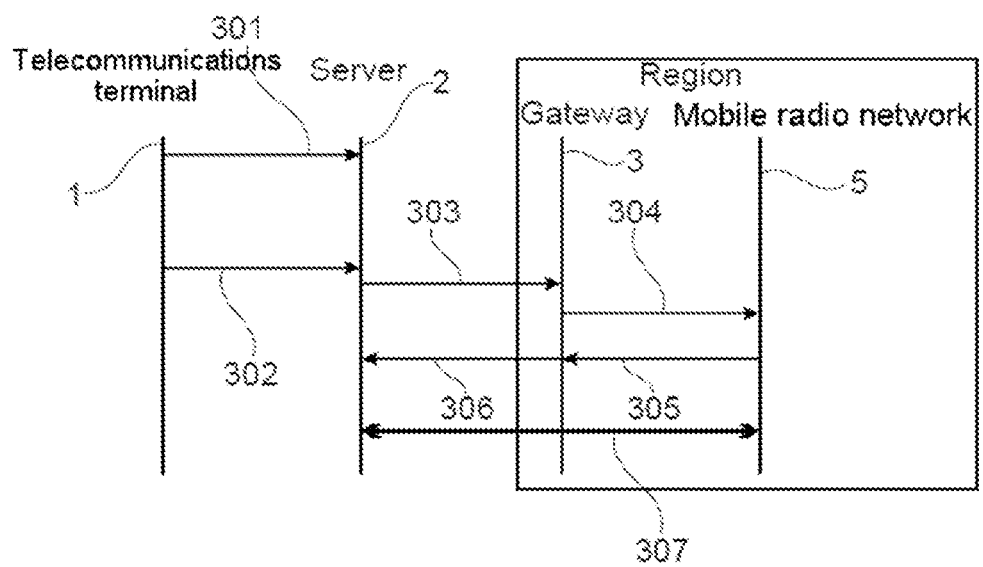
FIG. 3 shows a flow diagram representing the signaling procedure between the telecommunications terminal, the server, the mobile radio gateway and the mobile radio network for setting up a data connection to the Internet according to one embodiment of the method according to the invention.
Figure 4:
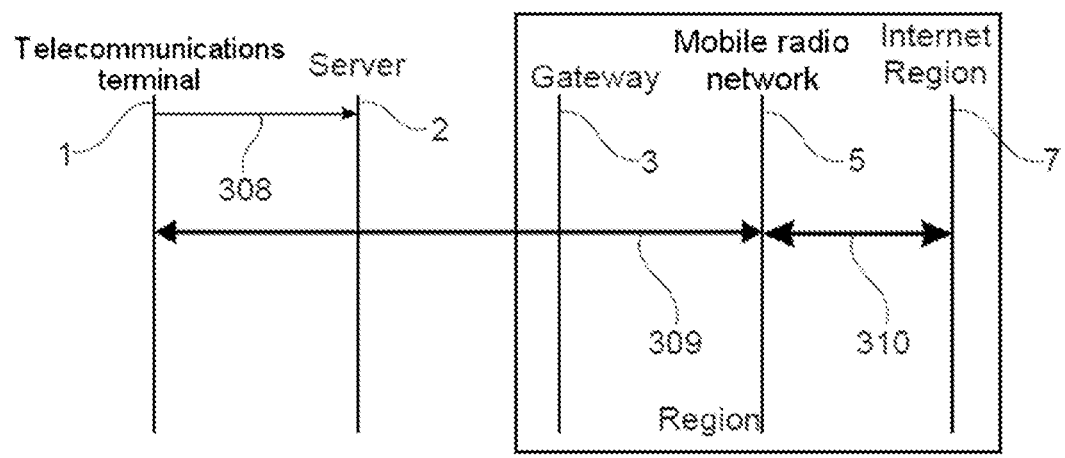
FIG. 4 shows the continuation of the flow diagram from FIG. 3.

According to a first design variant, FIGS. 3 and 4 show the signaling procedure between the telecommunications terminal 1, the server 2, the mobile radio gateway 3 and the mobile radio network 5.

According to step 301, a SIM card is assigned at any time to the telecommunications terminal 1. The assignment can be performed via the user of the telecommunications terminal 1, an administrator or the server 2. The assignment can be performed by means of a manual command or automatically. A data connection between the telecommunications terminal 1 and the server 2 required for step 301 can then be released once more. In any event, the server 2 is to be informed of the assignment, unless it is performed by the server itself.

According to step 302, a command to log in the SIM card to the mobile radio gateway is transmitted from the telecommunications terminal 1 to the server 2. The command can be generated manually or automatically. The SIM card is then allocated by the server 2 according to step 303 to the mobile radio gateway 3 (either directly or via the SIM server 20 according to FIG. 1). The command 302 can also be transmitted to the server 2 without a data connection being maintained.

According to step 304, the SIM card is logged in to the mobile radio network 5 by means of a radio module of the mobile radio gateway 3. A data connection is then set up in the mobile radio network 5 according to step 305. This is done via a local IP address of the mobile radio gateway 3 and a local access of the mobile radio gateway 3 to the mobile radio network 5. As soon as this is done, a secure data connection (the data connection 82 shown in FIG. 2) is set up according to step 306 between the mobile radio gateway 3 and the server 2. A first IP tunnel address is allocated to the secure data connection. The data from this data channel are then exchanged transparently between the server 2 and the mobile radio network 5, wherein a routing of the data between the secure data connection to the server 2 and the mobile radio data connection into the mobile radio network 5 is performed in the mobile radio gateway, wherein the data or data packets are assigned for this purpose via the local IP address on the one hand and the first IP tunnel address on the other hand.

According to step 307, the data are thus forwarded transparently between the server 2 and the mobile radio network 5.

FIG. 4 shows the continuation of the signaling shown in FIG. 3. If, according to step 308, a second secure data connection is set up by the user or the telecommunications terminal 1 (or alternatively by the server 2) between the telecommunications terminal 1 and the server 2 (the data connection 81 shown in FIG. 2), the server 2 connects this secure data connection of the user or the telecommunications terminal 1 (to which a second IP tunnel address is allocated) to the telecommunications terminal 1 or the SIM card 4. To do this, the server 2 performs a routing of the data between the first secure data connection and the second secure data connection, wherein the data or data packets are assigned for this purpose via the first IP tunnel address on the one hand and the second IP tunnel address on the other hand. Thus, according to step 309, a transparent data tunnel is created between the telecommunications terminal 1 and the mobile radio network 5 of the region concerned.

The server 2 can assign the secure data connection with the mobile radio gateway 3, which is established on the basis of the mobile radio communication of the logged in SIM card 4, to the secure data connection with the telecommunications terminal 1, since it is informed of the assignment of the SIM card 4 to the telecommunications terminal 1.

According to step 310, the data tunnel can provide access into the downstream data network, generally the—regional—Internet. For the mobile radio network 5 and the downstream data network 7, the telecommunications terminal 1 behaves as if it is situated locally in the region which is covered by the mobile radio network 5.

It should be noted that the data connections concerned are connections on layers 1 to 4 and possibly also layer 5 of the OSI reference model which serve to provide connectivity. This connectivity is the prerequisite for the implementation of applications and services which are located on layer 7 of the OSI reference model.

Figure 5:
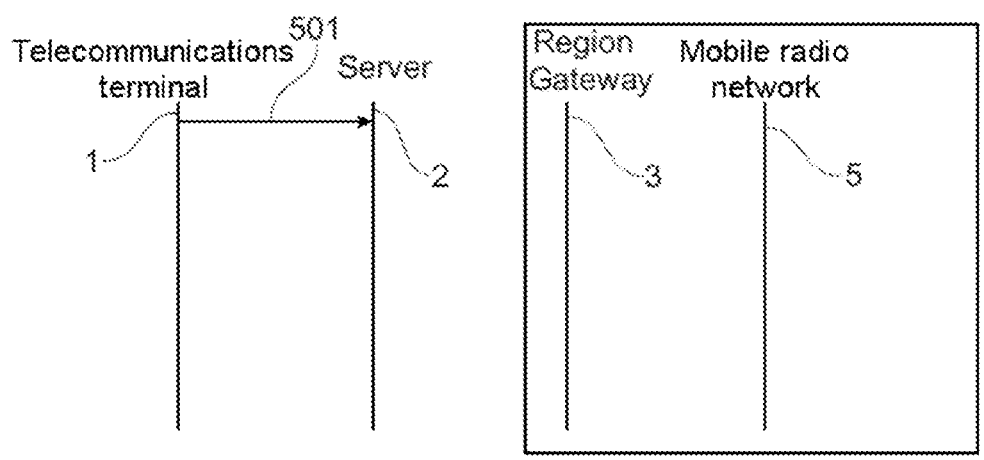
FIG. 5 shows a further flow diagram representing the signaling procedure between the telecommunications terminal, the server, the mobile radio gateway and the mobile radio network for setting up a data connection to the Internet according to one embodiment of the method according to the invention.
Figure 6:
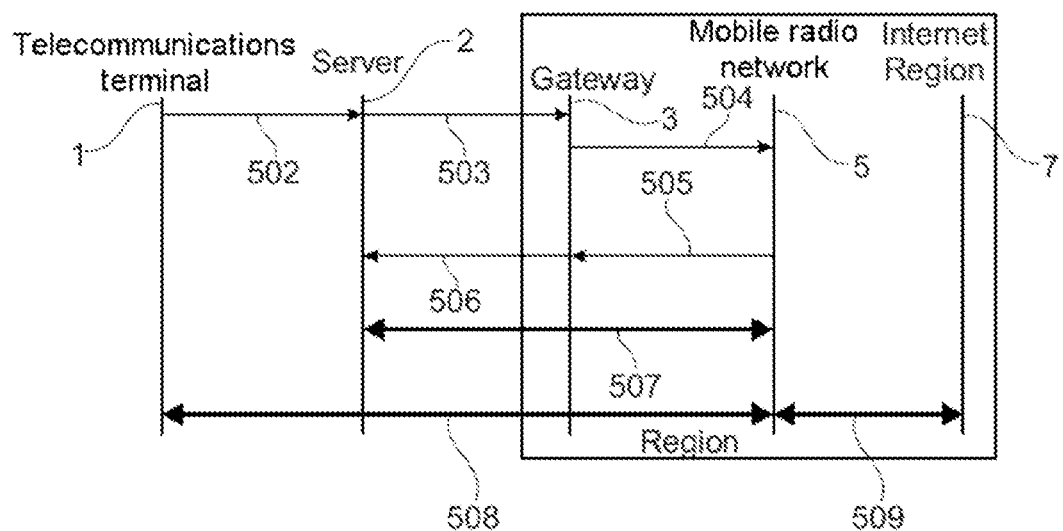
FIG. 6 shows the continuation of the flow diagram from FIG. 5.

According to a second design variant, FIGS. 5 and 6 show the signaling procedure between the telecommunications terminal 1, the server 2, the mobile radio gateway 3 and the mobile radio network 5.

As in the first design variant, a SIM card is assigned at any time to the telecommunications terminal 1 according to step 501. The assignment can be performed via the user of the telecommunications terminal 1, an administrator or the server 2. The assignment can be performed by means of a manual command or automatically. A data connection between the telecommunications terminal 1 and the server 2 required for step 301 can then be released once more. In any event, the server 2 is to be informed of the assignment, unless said assignment is performed by the server itself.

If, according to step 502, the user or the telecommunications terminal 1 sets up a secure data connection (for example a VPN connection) to the server 2, the SIM card assigned to the telecommunications terminal 1 or the SIM information data are provided according to step 503 to the mobile radio gateway 3 (by the server 2 or a SIM server 20), and the mobile radio gateway 3 is logged in to the mobile radio network 5 using the allocated SIM card according to step 504. In this design variant, a secure data connection is therefore first set up between the telecommunications terminal and the server 2 (the data connection 81 shown in FIG. 2). A (second) IP tunnel address is assigned to this secure data connection.

The method then continues according to FIGS. 3 and 4. As soon as the SIM card has been successfully logged in and a data connection has been set up by the mobile radio network 5 (via a local IP address of the mobile radio gateway 3 and a local access of the mobile radio gateway 3 to the mobile radio network 5) according to step 505, a further secure connection, for example a VPN connection, is set up according to step 506 between the mobile radio gateway and the server 2. A (first) IP tunnel address is assigned to this secure data connection. The data from this data channel are then exchanged transparently between the server 2 and the mobile radio network 5 according to step 507, wherein a routing of the data between the secure data connection to the server 2 and the mobile radio data connection into the mobile radio network 5 is performed in the mobile radio gateway, wherein the data or data packets are assigned for this purpose via the local IP address on the one hand and the first IP tunnel address on the other hand.

It is further provided that the server 2 connects the secure data connection between the server 2 and the mobile radio gateway 3 to the secure data connection set up in step 502 between the telecommunications terminal 1 and the server 2. To do this, the server 2 performs a routing of the data between the two secure data connections, wherein the data or data packets are assigned for this purpose via the first IP tunnel address on the one hand and the second IP tunnel address on the other hand. A transparent data tunnel is thus created according to step 508 between the telecommunications terminal 1 and the mobile radio network 5 of the region concerned. According to step 509, this data tunnel can provide access into the downstream data network, generally the—regional—Internet 7. For the mobile radio network 5 and the downstream data network 7, the telecommunications terminal 1 behaves as if it is situated locally in the region which is covered by the mobile radio network 5.

Following the provision of a data connection of the telecommunications terminal 1 to the Internet 7 according to the method shown in FIGS. 3 and 4 or the method shown in FIGS. 5 and 6, a connectivity of the telecommunications terminal 1 to the Internet 7 is provided, on the basis of which telecommunications connections can be established between the telecommunications terminal 1 and a communication partner, for example a server of the Internet or a further telecommunications terminal, in order to implement an application or service on layer 7 of the ISO reference model.

Figure 7:
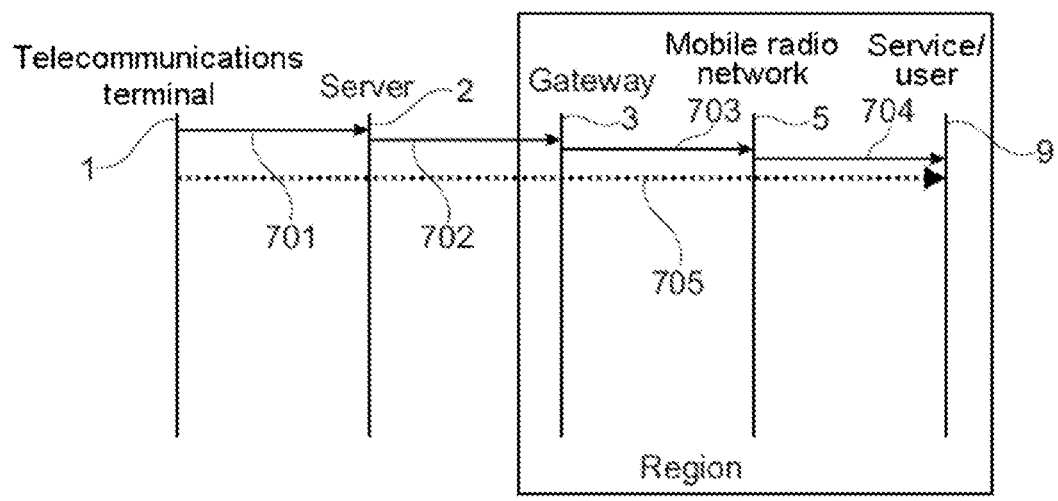
FIG. 7 shows a flow diagram representing the signaling procedure between the telecommunications terminal, the server, the mobile radio gateway and the mobile radio network for transmitting an SMS/MMS message to a regional user or service provider.
Figure 8:
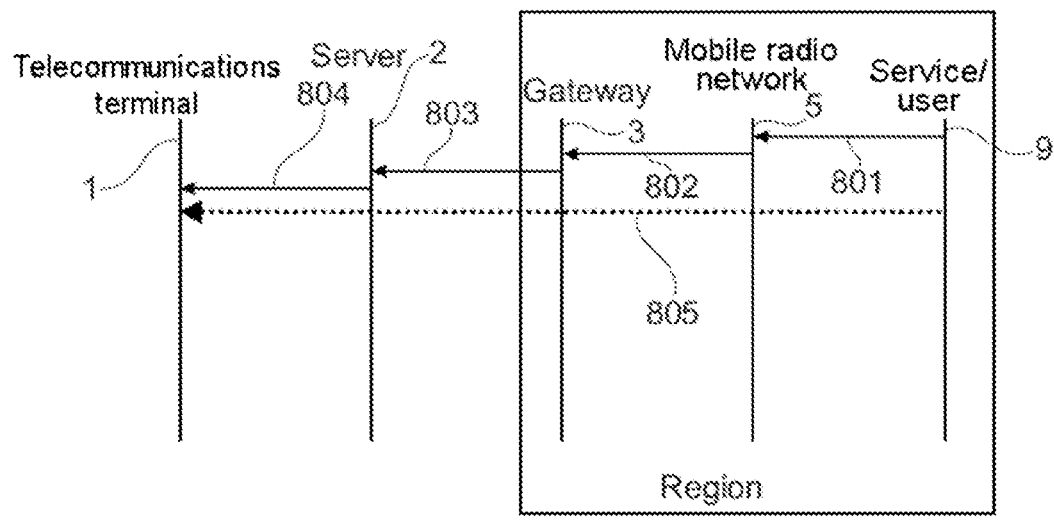
FIG. 8 shows a flow diagram representing the signaling procedure between the telecommunications terminal, the server, the mobile radio gateway and the mobile radio network for receiving an SMS/MMS message from a regional user or service provider.

In this respect, FIGS. 7 and 8 show, by way of example, the implementation of a service with which an SMS/MMS message is transmitted or received by the telecommunications terminal 1. According to FIG. 7, based on the situation wherein a SIM card is assigned to the telecommunications terminal 1, it is provided that the user or the telecommunications terminal transmits an SMS/MMS message to a regional user or service provider. The telecommunications terminal 1 transmits the SMS/MMS message to the server 2 while inputting a recipient according to step 701. Insofar as the telecommunications terminal 1 is not a mobile radio terminal, the SMS/MMS message is made available, for example via a user interface on the server 2 (for example an HTML interface) or via a different interface. The server 2 forwards the message according to step 702 to the mobile radio gateway 3. The latter transmits the SMS/MMS message according to step 703 via the mobile radio network 5. The latter transmits the message according to step 704 via the Internet to a service or user 9. As a whole, a transmission path 705 is thus provided from the telecommunications terminal to the service/user 9.

According to FIG. 8, a user or his telecommunications terminal 1 receives an SMS/MMS message from a regional user or service provider 9, for example with a two-way authorization in cooperation with a data application. The message is transmitted by the service/user 9 via the Internet into the mobile radio network 5 and is received by the mobile radio gateway 3 (steps 801, 802). The mobile radio gateway 3 forwards the received SMS/MMS message to the server 2 in step 803. The server 2 forwards the received SMS/MMS message according to step 804 to the telecommunications terminal 1. As a whole, a transmission path 805 is thus provided from the service/user 9 to the telecommunications terminal 1.

The invention is obviously not restricted to the embodiments described above and different modifications and improvements can be undertaken without departing from the concepts described here. It should further be noted that any of the described features can be used separately or in combination with any other features, unless they mutually exclude one another. The disclosure extends to and comprises all combinations and sub-combinations of one or more features which are described here. Insofar as ranges are defined, they comprise all values within these ranges and all sub-ranges which fall within a range.

The invention claimed is:

1. A method for providing a data connection to the Internet on a telecommunications terminal using a mobile radio network, wherein the method comprises:
   assigning a SIM card to the telecommunications terminal and recording this assignment on a server;
   providing the SIM card to a mobile radio gateway;
   logging in a radio module of the mobile radio gateway to the mobile radio network using the provided SIM card;
   setting up a mobile radio data connection by means of the logged in radio module of the mobile radio gateway via the mobile radio network to the Internet;
   setting up a first secure data connection between the mobile radio gateway and the server, wherein data are transmittable transparently between the Internet and the server via the mobile radio data connection and the first secure data connection;
   setting up a second secure data connection between the telecommunications terminal and the server;
   connecting the first secure data connection and the second secure data connection by means of the server in order to provide a data connection of the telecommunications terminal to the Internet via the second secure data connection, the first secure data connection and the mobile radio data connection.

2. The method of claim 1, wherein the SIM card is provided to the mobile radio gateway by the server, wherein the server is a SIM server.

3. The method of claim 1, wherein the SIM card is provided to the mobile radio gateway by a SIM server which communicates with the server.

4. The method of claim 1, wherein the SIM card is assigned to the telecommunications terminal by the server.

5. The method of claim 1, wherein the second secure data connection between the telecommunications terminal and the server is set up before the first secure data connection between the mobile radio gateway and the server, wherein the setting up of the second secure data connection triggers the provision of the SIM card in the mobile radio gateway.

6. The method of claim 1, wherein the first secure connection between the mobile radio gateway and the server is set up before the second secure data connection between the telecommunications terminal and the server.

7. The method of claim 1, wherein the server connects the first secure data connection and the second secure data connection by assigning the two connections to one another so that data can be forwarded from the one connection onto the other connection and vice versa.

8. The method of claim 7, wherein the server assigns the two connections by assigning IP addresses to one another which are assigned in each case to the first secure data connection and the second secure data connection.

9. The method of claim 1, wherein the first secure data connection and the second secure data connection are in each case a VPN connection or a different tunnel.

10. The method of claim 1, wherein the telecommunications terminal, following the provision of a data connection of the telecommunications terminal to the Internet, implements an application or service and for this purpose sets up a telecommunications connection to a server of the Internet and/or to a further telecommunications terminal.

11. The method of claim 10, wherein an SMS/MMS/voice message is transmitted to and/or received by the server of the Internet and/or the further telecommunications terminal via the telecommunications connection.

12. The method of claim 1, wherein the mobile radio network is a mobile radio network of a country other than the country in which the home mobile radio network of the SIM card is implemented, wherein a radio module of the mobile radio gateway logs in to the mobile radio network using the provided SIM card through roaming.

13. The method of claim 1, wherein the mobile radio network is the home mobile radio network of the SIM card.

14. A server system, comprising:
   a SIM server comprising a first processor and a first memory, and the SIM server is operable to:
      assign a SIM card to a telecommunications terminal;
      provide the SIM card assigned to the telecommunications terminal to a mobile radio gateway; and
      cause the mobile radio gateway to log in to the mobile radio network using the received SIM card and set up a mobile radio data connection via the mobile radio network to the Internet; and
   another server comprising a second processor and a second memory, and the another server is operable to:
      set up a first secure data connection between the server and a mobile radio gateway, wherein data are transmittable transparently between the mobile radio network and the server via the mobile radio data connection and the first secure data connection; and
      a second secure data connection between the server and the telecommunications terminal; and
      connect the first secure data connection and the second secure data connection for the provision of a data connection of the telecommunications terminal to the Internet via the second secure data connection, the first secure data connection and the mobile radio data connection.

15. The server system of claim 14, wherein the SIM server and/or the another server comprise physical or virtual servers.

16. The server system of claim 14, wherein the SIM server provides the SIM card to the mobile radio gateway by providing information data enabling a login of the SIM card to the mobile radio network to the mobile radio gateway.

17. The server system of claim 14, wherein the another server connects the first secure data connection and the second secure data connection by assigning the two connections to one another so that data can be forwarded from the one connection to the other connection and vice versa.

18. The server system of claim 17, wherein the another server assigns the two connections to one another by assigning IP addresses to one another which are assigned in each case to the first secure data connection and to the second secure data connection.

19. A mobile radio gateway, comprising:
a plurality of radio modules for mobile radio communication, wherein SIM cards which in each case allow a use of the radio module for mobile radio communication in a mobile radio network are assignable to the mobile radio gateway;
a first processor and a first memory which is connected to the first processor and in which instructions are stored which, when executed by the first processor, cause the first processor to receive a SIM card and assign it to one of the radio modules, wherein the radio module is provided and designed to log in, after receiving the SIM card, to the mobile radio network using the received SIM card and set up a mobile radio data connection via the mobile radio network into the Internet; and
a second processor and a second memory which is connected to the second processor and in which instructions are stored which, when executed by the second processor, cause the second processor to set up a first secure data connection between the mobile radio gateway and a server and to interconnect the mobile radio data connection and the first secure data connection, wherein data are transmittable transparently between the mobile radio network and the server via the mobile radio data connection and the first secure data connection.

* * * * *